United States Patent
Tan

(10) Patent No.: US 8,720,282 B2
(45) Date of Patent: May 13, 2014

(54) AIR PRESSURE DROP DETECTING DEVICE FOR COOLING FAN

(75) Inventor: Xian-Guang Tan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 195 days.

(21) Appl. No.: 13/410,429

(22) Filed: Mar. 2, 2012

(65) Prior Publication Data

US 2012/0325015 A1 Dec. 27, 2012

(30) Foreign Application Priority Data

Jun. 24, 2011 (CN) .......................... 2011 1 0173072

(51) Int. Cl.
- *G01F 1/34* (2006.01)
- *G01L 7/00* (2006.01)
- *G01P 15/00* (2006.01)
- *G01F 1/00* (2006.01)
- *G01F 13/00* (2006.01)
- *G01P 5/00* (2006.01)

(52) U.S. Cl.
USPC .......... 73/861.42; 73/488; 73/700; 73/170.07

(58) Field of Classification Search
USPC ................................ 73/861.42, 700
See application file for complete search history.

(56) References Cited

U.S. PATENT DOCUMENTS

| | | | |
|---|---|---|---|
| 4,407,185 A * | 10/1983 | Haines et al. .................. | 454/238 |
| 6,662,575 B2 * | 12/2003 | Clarke .............. | 62/87 |
| 2009/0143998 A1 * | 6/2009 | De Cristofaro et al. ........ | 702/45 |
| 2011/0286861 A1 * | 11/2011 | Field et al. ...................... | 417/53 |
| 2013/0239803 A1 * | 9/2013 | Palmer .............. | 95/22 |
| 2013/0276629 A1 * | 10/2013 | Salahshour et al. ............. | 95/25 |

\* cited by examiner

*Primary Examiner* — Lisa Caputo
*Assistant Examiner* — Jamel Williams
(74) *Attorney, Agent, or Firm* — Novak Druce Connolly Bove + Quigg LLP

(57) ABSTRACT

An air pressure drop detecting device for detecting air flow volume of a cooling fan includes a first pressure sensor, a second pressure sensor, and a display unit. The cooling fan has an air inlet and an air outlet opposite to the air inlet. The first pressure sensor is positioned in the air inlet and detects a plurality of first pressure values. The second pressure sensor is positioned in the air outlet and detects a plurality of second pressure values. The display unit is connected to the first pressure sensor and the second pressure sensor to display the first pressure values and the second pressure values, and a position of the cooling fan in the computer case is determined by the pressure difference between the first pressure values and the second pressure values.

10 Claims, 3 Drawing Sheets

AIR PRESSURE DROP DETECTING DEVICE FOR COOLING FAN

BACKGROUND

1. Technical Field

The present disclosure generally relates to detecting devices, and particularly to an air pressure drop detecting device for a cooling fan and a method of assembling the cooling fan in a computer case using the air pressure drop detecting device.

2. Description of the Related Art

Cooling fans are used inside the electronic devices, such as a computer case, for cooling the electrical components housed inside the electronic devices. The cooling fan is generally positioned between a housing and a motherboard in the computer case. The cooling effect of the cooling fan is affected by the position of the cooling fan. However, because there is no special detecting devices for detecting the efficiency of the cooling fan located at different positions, the cooling fan is randomly positioned on the housing according to an operator's personal judgment, and thus when the cooling fan is installed is not likely to achieve best cooling effect.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
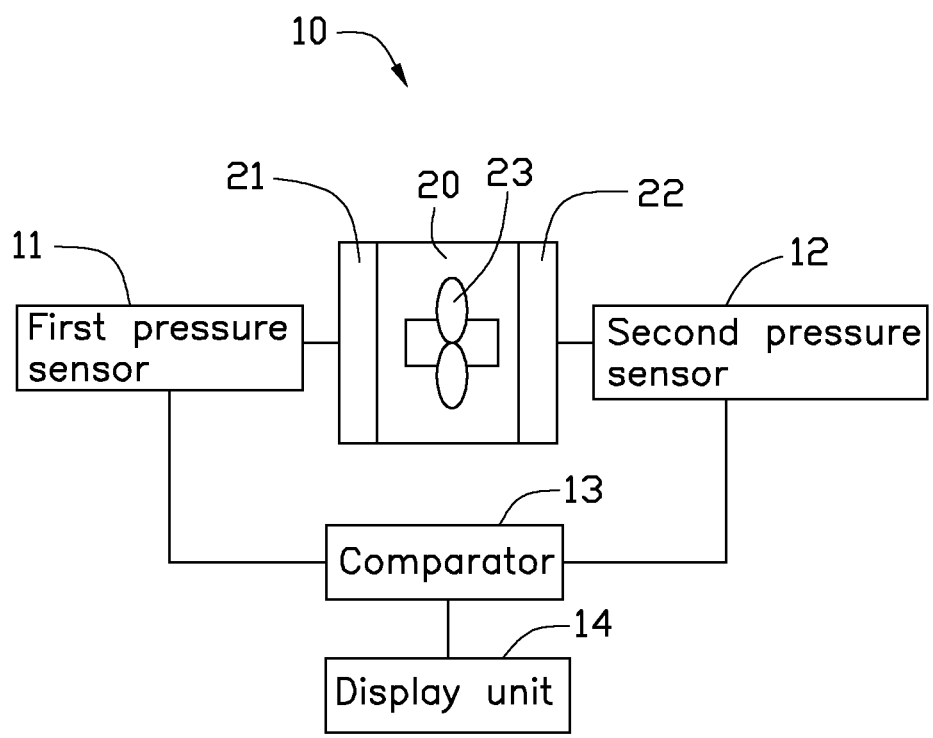
FIG. 1 is a schematic view of an embodiment of an air pressure drop detecting device used in a cooling fan.

Referring to FIG. 1, an embodiment of an air pressure drop detecting device 10 for detecting the air flow volume of a cooling fan 20 includes a first pressure sensor 11, a second pressure sensor 12, a comparator 13, and a display unit 14.

The cooling fan 20 defines an air inlet 21 and an air outlet 22 opposite to the air inlet 21. The first pressure sensor 11 is positioned in the air inlet 21, and the second pressure sensor 12 is positioned in the air outlet 22. In the illustrated embodiment, the first pressure sensor 11 and the second pressure sensor 12 are positioned between a plurality of blades 23 of the cooling fan 20. The first pressure sensor 11 and the second pressure sensor 12 can be selected from a group consisting of a sapphire pressure sensor, a proliferation silicon pressure sensor, and a ceramic pressure sensor.

When the blades 23 of the cooling fan 20 are driven to rotate, air from the cooling fan 20 will flow, and thus the air pressure of the air inlet 21 is greater than that of the air outlet 22. As a result, a first pressure value detected by the first pressure sensor 11 is greater than a second pressure value detected by the second pressure sensor 12. Air flows into the inner side of the cooling fan 20 via the air inlet 21, and outputs from the cooling fan 20 via the air outlet 22 due to the air pressure difference between the air inlet 21 and the air outlet 22.

The first pressure sensor 11 and the second pressure sensor 12 are connected to the comparator 13, and the comparator 13 is connected to the display unit 14. The first pressure sensor 11 detects the first pressure value and generates a first signal, and then transfers the first signal to the comparator 13. The second pressure sensor 12 detects the second pressure value and generates a second signal, and then transfers the second signal to the comparator 13. The comparator 13 compares the first signal and the second signal to calculate the pressure difference between the air inlet 21 and the air outlet 22, and then the display unit 14 displays the pressure difference thereon.

In an alternative embodiment, the comparator 13 is not considered crucial component to have, and the first pressure sensor 11 and the second pressure sensor 12 are thereby directly connected to the display unit 14. As such, the air pressure difference between the air inlet 21 and the air outlet 22 may be calculated by the user.

Figure 2:
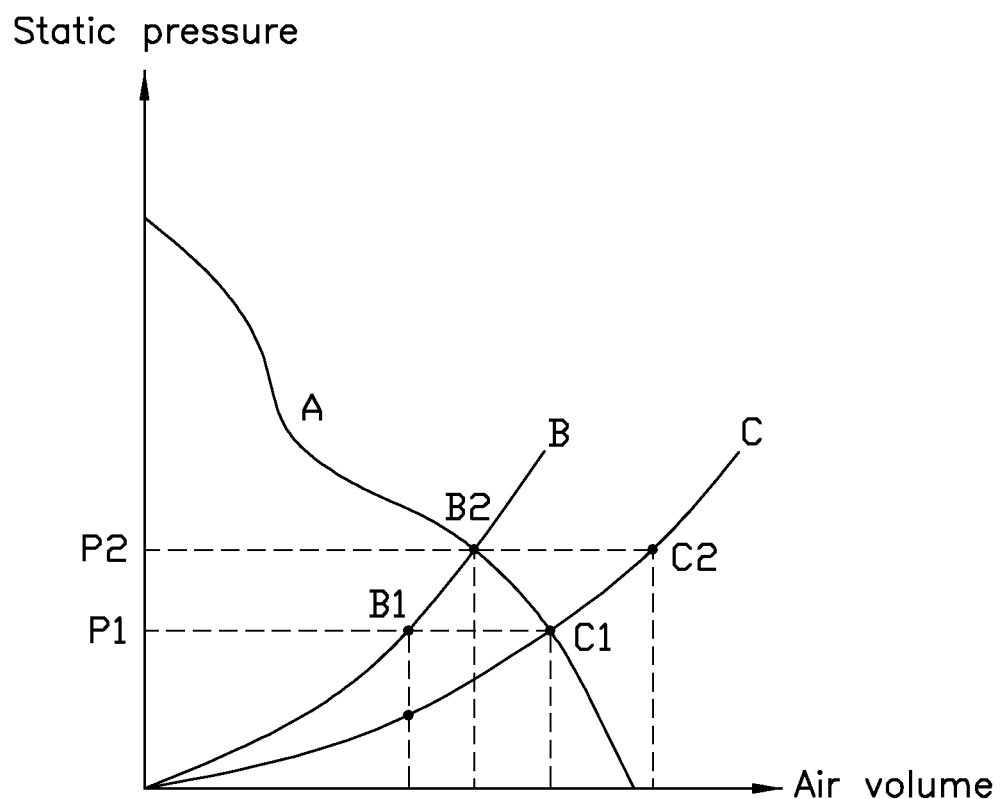
FIG. 2 is a diagram showing the relationship between the static pressure and the air flow volume of a cooling fan.

Referring to FIGS. 1 and 2, if the blades 23 of the cooling fan 20 rotate at a fixed speed, the air pressure difference between the air inlet 21 and the air outlet 22 is a static pressure corresponding to the fixed speed of the cooling fan 20. That is, each quantum of static pressure corresponds to a fixed air flow volume out of the cooling fan 20.

As shown in FIG. 2, a curve A represents a relationship between the static pressure and the air flow volume without system impedance or other system losses. Curves B and C represent the relationship between the static pressure and the air flow volume under different system impedances, and the system impedance of the curve B is lower than that of the curve C. Curves B and C are obtained by detecting the air flow volumes at different static pressures. For example, if the static pressure is P1, the air flow volume out of the cooling fan 20 is B1 under the system impedance of the curve B, and the air flow volume is C1 under the system impedance of the curve C. If the static pressure is P2, the air flow volume out of the cooling fan 20 is B2 under the system impedance of the curve B, and the air flow volume is C2 under the system impedance of the curve C.

Figure 3:
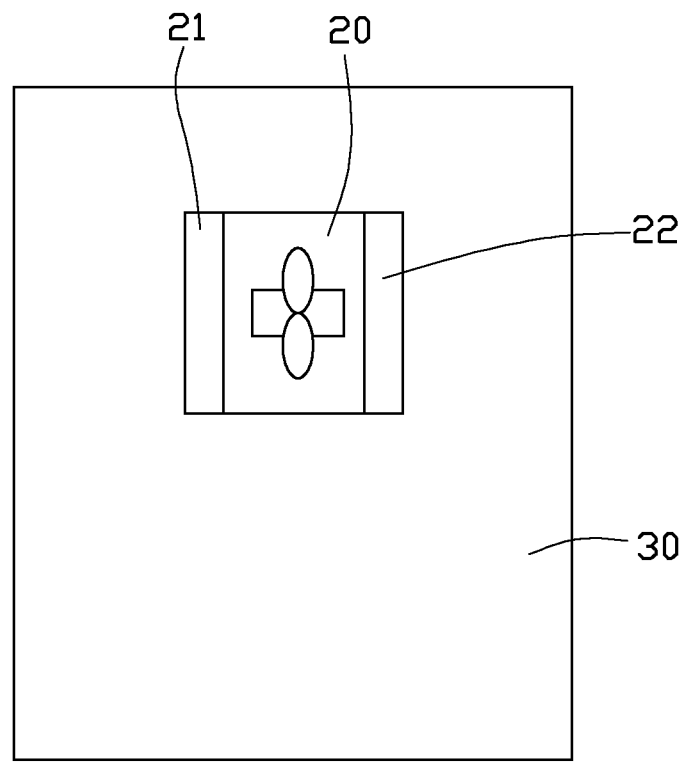
FIG. 3 is a schematic view of the cooling fan of FIG. 1 positioned in a computer case.

If the cooling fan 20 is located in different parts of a computer case 30, and because the system impedances of the cooling fan 20 are different, therefore, the corresponding air flow volumes outputted from the cooling fan 20 is also different as shown in FIG. 2. Therefore, a position of the cooling fan 20 in the computer case 30 is determinable by using the air pressure drop detecting device 10 to detect the static pressure of the cooling fan 20. Referring to FIGS. 1 and 3, in detail, the cooling fan 20 is positioned in different parts of the computer case 30, and then the air pressure difference between the air inlet 21 and the air outlet 22 (static pressure) is detectable by the air pressure drop detecting device 10. After that, the static pressures of the cooling fan 20 in different parts of the computer case 30 are compared, and the cooling fan 20 can decidedly be finally positioned in the particular position with the lowest static pressures in the computer case 30. The cooling fan 20 having the lowest static pressures has the largest air flow volume out of the cooling fan 20, and thus the cooling fan 20 will achieve best cooling effect or performance. Therefore, the position of the cooling fan 20 in the computer case 30 can expediently be determined by using the air pressure drop detecting device 10.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An air pressure drop detecting device for detecting air flow volume of a cooling fan having an air inlet and an air outlet opposite to the air inlet, comprising:
   a first pressure sensor positioned in the air inlet and detecting a plurality of first pressure values;
   a second pressure sensor positioned in the air outlet and detecting a plurality of second pressure values; and
   a display unit connected to the first pressure sensor and the second pressure sensor to display the first pressure values and the second pressure values, wherein a position of the cooling fan is determined by the pressure difference between the first pressure values and the second pressure values.

2. The air pressure drop detecting device of claim 1, further comprising a comparator connected among the first pressure sensor, the second pressure sensor, and the display unit; wherein the comparator compares the first pressure values and the second pressure values to calculate the pressure difference between the air inlet and the air outlet.

3. The air pressure drop detecting device of claim 1, wherein the first pressure sensor and the second pressure sensor are positioned between a plurality of blades of the cooling fan.

4. The air pressure drop detecting device of claim 1, wherein the first pressure sensor is selected from a group consisting of a sapphire pressure sensor, a proliferation silicon pressure sensor, and a ceramic pressure sensor.

5. The air pressure drop detecting device of claim 4, wherein the second pressure sensor is selected from a group consisting of a sapphire pressure sensor, a proliferation silicon pressure sensor, and a ceramic pressure sensor.

6. An air pressure drop detecting device, comprising:
   a first pressure sensor for detecting a plurality of first pressure values;
   a second pressure sensor for detecting a plurality of second pressure values; and
   a display unit connected to the first pressure sensor and the second pressure sensor, respectively, to display the first pressure values and the second pressure values, thereby obtaining a pressure difference between the first pressure values and the second pressure values.

7. The air pressure drop detecting device of claim 6, further comprising a comparator connected among the first pressure sensor, the second pressure sensor, and the display unit; wherein the comparator compares the first pressure values and the second pressure values to calculate the pressure difference between the air inlet and the air outlet.

8. The air pressure drop detecting device of claim 6, wherein the first pressure sensor is selected from a group consisting of a sapphire pressure sensor, a proliferation silicon pressure sensor, and a ceramic pressure sensor.

9. The air pressure drop detecting device of claim 8, wherein the second pressure sensor is selected from a group consisting of a sapphire pressure sensor, a proliferation silicon pressure sensor, and a ceramic pressure sensor.

10. A method of assembling a cooling fan to a computer case, comprising:
   providing an air pressure drop detecting device having a first pressure sensor positioned in an air inlet of the cooling fan and a second pressure sensor positioned in an air outlet of the cooling fan;
   positioning the cooling fan in a plurality of different parts of a computer case, and the air pressure drop detecting device detecting a plurality of values of the pressure difference between the air inlet and the air outlet; and
   fixing the cooling fan in a position of the computer case having the lowest value of the pressure difference between the air inlet and the air outlet.

* * * * *